United States Patent
Shah et al.

(10) Patent No.: US 9,970,504 B2
(45) Date of Patent: May 15, 2018

(54) THERMAL INSULATING CONCRETE COMPOSITION

(71) Applicant: Shawcor Ltd., Toronto (CA)

(72) Inventors: Sanjay Shah, Toronto (CA); Afolabi Lowrie, Toronto (CA); Eugene Alymov, Toronto (CA)

(73) Assignee: SHAWCOR LTD, Toronto, Ontario (CA)

( * ) Notice: Subject to any disclaimer, the term of this patent is extended or adjusted under 35 U.S.C. 154(b) by 473 days.

(21) Appl. No.: 14/399,416

(22) PCT Filed: May 8, 2013

(86) PCT No.: PCT/CA2013/050356
§ 371 (c)(1),
(2) Date: Nov. 6, 2014

(87) PCT Pub. No.: WO2013/166603
PCT Pub. Date: Nov. 14, 2013

(65) Prior Publication Data
US 2015/0102540 A1    Apr. 16, 2015

Related U.S. Application Data

(60) Provisional application No. 61/644,656, filed on May 9, 2012, provisional application No. 61/655,598, filed on Jun. 5, 2012.

(51) Int. Cl.
*F16L 9/00*    (2006.01)
*F16F 9/05*    (2006.01)
(Continued)

(52) U.S. Cl.
CPC ............... *F16F 9/05* (2013.01); *B61F 5/10* (2013.01); *C04B 28/006* (2013.01); *C04B 28/04* (2013.01); *C04B 28/06* (2013.01); *C09D 1/06* (2013.01); *C09D 7/1291* (2013.01); *F16F 9/0454* (2013.01); *C04B 2111/00482* (2013.01); *C04B 2111/00612* (2013.01); *Y02P 40/165* (2015.11); *Y02W 30/92* (2015.05); *Y02W 30/94* (2015.05)

(58) Field of Classification Search
CPC .......................................................... F16L 9/14
USPC ................. 138/149, 137, 140; 405/157, 158
See application file for complete search history.

(56) References Cited

U.S. PATENT DOCUMENTS 3,955,600 A * 5/1976 Tamburello ............... F16L 1/16
                                                              138/141
3,963,056 A * 6/1976 Shibuya .................... E02D 5/30
                                                              138/175

(Continued)

FOREIGN PATENT DOCUMENTS

EP        1483220     12/2004
WO        96/07846    3/1996

*Primary Examiner* — Patrick F Brinson
(74) *Attorney, Agent, or Firm* — DeLio, Peterson & Curcio LLC; Kelly M. Nowak

(57) ABSTRACT

A concrete coating composition, containing a thermally stable cement, glass bubbles, porous glass spheres or aerogel or a combination thereof, and glass fibers. Also, disclosed is a coated pipe having the concrete coating composition disclosed herein. The coated pipes disclosed herein can be thermally insulated, impact and abrasion resistant, flexible pipeline that can be used in downhole steam injection operations and for extracting hydrocarbons.

40 Claims, 6 Drawing Sheets

(51) Int. Cl.
   *C09D 1/06* (2006.01)
   *C04B 28/00* (2006.01)
   *C04B 28/04* (2006.01)
   *C04B 28/06* (2006.01)
   *C09D 7/12* (2006.01)
   *B61F 5/10* (2006.01)
   *F16F 9/04* (2006.01)
   *C04B 111/00* (2006.01)

(56) References Cited

U.S. PATENT DOCUMENTS

| | | | |
|---|---|---|---|
| 4,247,516 A * | 1/1981 | Morgan | B28B 21/34 264/228 |
| 4,395,159 A * | 7/1983 | Karuks | B28B 19/0038 138/103 |
| 4,504,320 A | 3/1985 | Rizer et al. | |
| 4,640,312 A * | 2/1987 | Patell | B28B 19/0023 138/109 |
| 5,476,343 A | 12/1995 | Sumner | |
| 5,641,584 A * | 6/1997 | Andersen | B28B 1/00 106/675 |
| 5,871,034 A * | 2/1999 | Sumner | F16L 59/14 138/137 |
| 6,076,562 A * | 6/2000 | Kuo | F16L 9/08 138/141 |
| 6,182,705 B1 * | 2/2001 | Sumner | F16L 59/14 138/140 |
| 8,544,505 B1 * | 10/2013 | Kuo | F16L 9/14 138/175 |
| 8,627,854 B2 * | 1/2014 | Friedrich | B28B 3/003 138/143 |
| 2004/0016371 A1 * | 1/2004 | Chatterji | C04B 20/1051 106/716 |

* cited by examiner

| Section No. | Description | Units | Mix Designs | | | | | | | |
|---|---|---|---|---|---|---|---|---|---|---|
| | | | CaAl (70/30) | CaAl (50/30/20) | CaAl (45/35/20) | Thermal 40 | T40 (45/35/20) | PC (100% Port) | AG-Por | GeoPolymer |
| 1 | Mix Design | | | | | | | | | |
| | Cement Type | | Calcium Aluminate | Calcium Aluminate | Calcium Aluminate | Thermal 40 | Thermal 40 | Portland Cement | Thermal 40 | Geopolymer binder |
| | Cement Content | kg/m³ | 475 | 475 | 450 | 450 | 450 | 450 | 450 | |
| | water to cement ratio | w/c | 0.45 | 0.5 | 0.4 | 0.37 | 0.4 | 0.37 | 0.45 | 0.34 |
| | Poraver (2-4 mm) | % vol. agg | 70 | 50 | | | | | | 55 |
| | Poraver (1-2 mm) | % vol. agg | | | | | | 60 | | 16 |
| | Poraver (0.5-1 mm) | % vol. agg | 30 | 30 | 45 | 45 | 45 | 40 | 45 | 19 |
| | Poraver (0.25-0.5 mm) | % vol. agg | | | 35 | 35 | 35 | | | |
| | 3M S38/38 or K20/25 | % vol. agg | | 20 | 20 | 20 | 20 | | 20 | |
| | Aerogel Nanogel | % vol. agg | | | | | | | 35 | |
| | Nycon HD AR Glass Fibers | % vol. total | 0.2 | 0.5 | 0.2 | 0.2 | 0.2 | | 0.2 | 0.34 |
| | Advacast 575 | (mls/100 kg cement) | 50 | | 165 | 2100 | 1000 | 200 | 1000 | 0 |
| | V-mar 3 | (mls/100 kg cement) | 300 | 300 | 1300 | 1100 | 850 | | 775 | 0 |
| | Darex Air entrainer | (mls/100 kg cement) | 300 | 380 | 350 | 350 | 350 | 375 | 340 | 0 |
| 2 | Density | | | | | | | | | |
| | Theoretical Fresh | Kg/m³ | 943 | 950-1052 | 850 | 970 | 950-1022 | 1007 | 830-700 | 965 |
| | Minimum dry density | Kg/m³ | | 710-799 | | 800 | 800-685 | 830-920 | 550 | 725 |
| 3 | Compressive Strength (cubes) moisture cured | | | | | | | | | |
| | 1-day | MPa | 6.4 | 7.0 | 7.1 | 0.5 | 1.6 | 9.8 | 0.7 | |
| | 7-day | MPa | 13.9 | 13.4 | 17.8 | 11.8 | 4.1 | 11.8 | 3.0 | |
| | 28-day | MPa | 12.5 | 14.7 | | TBD | 13.0 | 11.4 | 8.1 | 20.0 |
| 4 | Thermal Conductivity at 23.8C | | | | | | | | | |
| | Fox 50 Unaged-New (Oven Dried) | W/mK | 0.204 | 0.261 | 0.196-0.210 | 0.218 | 0.268 | 0.151 | 0.126-0.140 | 0.263 |
| 5 | Thermal Properties | | | | | | | | | |
| | Heat Capacity @ 250 °C | J/kg K | TBD | 1355 | TBD | TBD | 1210 | TBD | TBD | |
| | Conductivity at 250 °C | W/mK | TBD | 0.724 | TBD | TBD | 0.219 | TBD | TBD | |
| | Diffusivity @ 250 °C | mm²/s | TBD | 0.263 | TBD | TBD | 0.267 | TBD | TBD | |
| 5 | Mechanical Properties | | | | | | | | | |
| | Poisson's ratio | | TBD | 0.32 | TBD | TBD | 0.27 | TBD | TBD | |
| | Modulus of Elasticity | GPa | TBD | 2.81 | TBD | TBD | 3.85 | TBD | TBD | |
| | Coefficient of Thermal Expansion | μm/m/°C | TBD | 12.26 | TBD | TBD | 19.08 | TBD | TBD | |
| | Flexural Strength | MPa | TBD | 0.85 | TBD | TBD | 0.95 | 1.9 | TBD | |
| | Tensile Strength | MPa | TBD | 1.05 | TBD | TBD | 0.75 | 1.4 | TBD | |
| 6 | Viscosity | | | | | | | | | |
| | Yield Value | Pa | TBD | 29.3 | TBD | N/A | 49.8 | 92.4 | TBD | |
| | Viscosity | Pa.s | TBD | 5.5 | TBD | N/A | 20.8 | 2.8 | TBD | |
| 7 | Rheology | | | | | | | | | |
| | Slump (cm) | cm | | 11.0 | 21.0 | N/A | N/A | | | |
| | Spread (cm) | cm | | 23.4 | 38.5 | 44.0 | 61.4 | | 49.0 | |
| | V-funnel Flow time | seconds | | 7.5 | TBD | 3.0 | 3.0 | | TBD | |

Figure 7

THERMAL INSULATING CONCRETE COMPOSITION

CROSS-REFERENCE TO RELATED APPLICATIONS

This application claims the benefit of and priority to U.S. Provisional Patent Application Nos. 61/644,656 filed May 9, 2012 and 61/655,598 filed Jun. 5, 2012, under the title THERMAL INSULTING CONCRETE COMPOSITION. The content of the above patent applications are hereby expressly incorporated by reference into the detailed description hereof.

FIELD

The specification relates to thermal insulating concrete composition, and a pipe having the thermal insulating concrete composition.

BACKGROUND

In the petroleum industry, injection and production tubings are disposed within a borehole for injecting steam into the borehole and for producing oil from subsurface bearing formations to the surface, respectively. This tubing is comprised of elongate sections threaded together to form the injection and production strings.

Downhole tubing must operate in a harsh thermal, mechanical and chemical environment. The tubing and any coating, if applied, on the tubing can be exposed to aromatic organic compounds and steam at very high temperatures (200-260° C.) and possibly high pressures. Where the tubing is used in oil extraction from tarsands, there can also be considerable abrasion of the tubing and its external coating, if applied. Also, where the downhole tubing is assembled by screwing together threaded pipe sections, substantial forces may be exerted on the pipe and any exterior coating on the pipe during assembly of the pipe string. All these factors can limit the type of coating that can be applied to the tubing.

During production operations, pipe clogging solids can become an issue if hot hydrocarbons are allowed to cool as they flow out of hydrocarbon reservoirs. Specifically, as temperature decreases, the flow through pipelines can be impeded by high viscosity and wax formation in liquid products such as tar/bitumen, and by hydrate formation in products such as natural gas. This can also result in significantly reduced internal flow diameters of production piping and well productivity.

These problems can be reduced by using vacuum insulated pipelines, but such insulated pipelines can be expensive.

Accordingly, there is a need in the art to provide an effective thermal insulation material for the external coating of pipes used for downhole tubing. Further, there is a need in the art for a thermal insulation coating having sufficient strength and compressibility to withstand the rough handling of pipe normally associated with the production process of hydrocarbons. Moreover, there is a need in the art for a process for application of such an external coating on pipes used in downhole tubing.

SUMMARY OF THE INVENTION

In one aspect, the specification relates to a concrete coating composition, comprising:
a thermally stable cement;
glass bubbles;
porous glass spheres or aerogel, or a combination thereof; and
glass fibres.

In another aspect, the specification discloses a coated pipe, comprising:
a pipe; and
the concrete coating composition as disclosed herein.

In a further aspect, the specification discloses a process for manufacturing the concrete coating composition as disclosed herein.

In a still further aspect, the specification discloses a process of manufacturing the coated pipe, as disclosed herein.

In another still further aspect, the specification discloses a process for extracting hydrocarbon, using the coated pipe as disclosed herein.

BRIEF DESCRIPTION OF THE DRAWINGS

Reference will now be made, by way of example, to the accompanying drawings which show example embodiments of the present application, and in which:

FIG. 7 discloses a table containing summary of some of the compositions prepared and their properties.

Similar reference numerals may have been used in different figures to denote similar components.

DESCRIPTION

Figure 1:
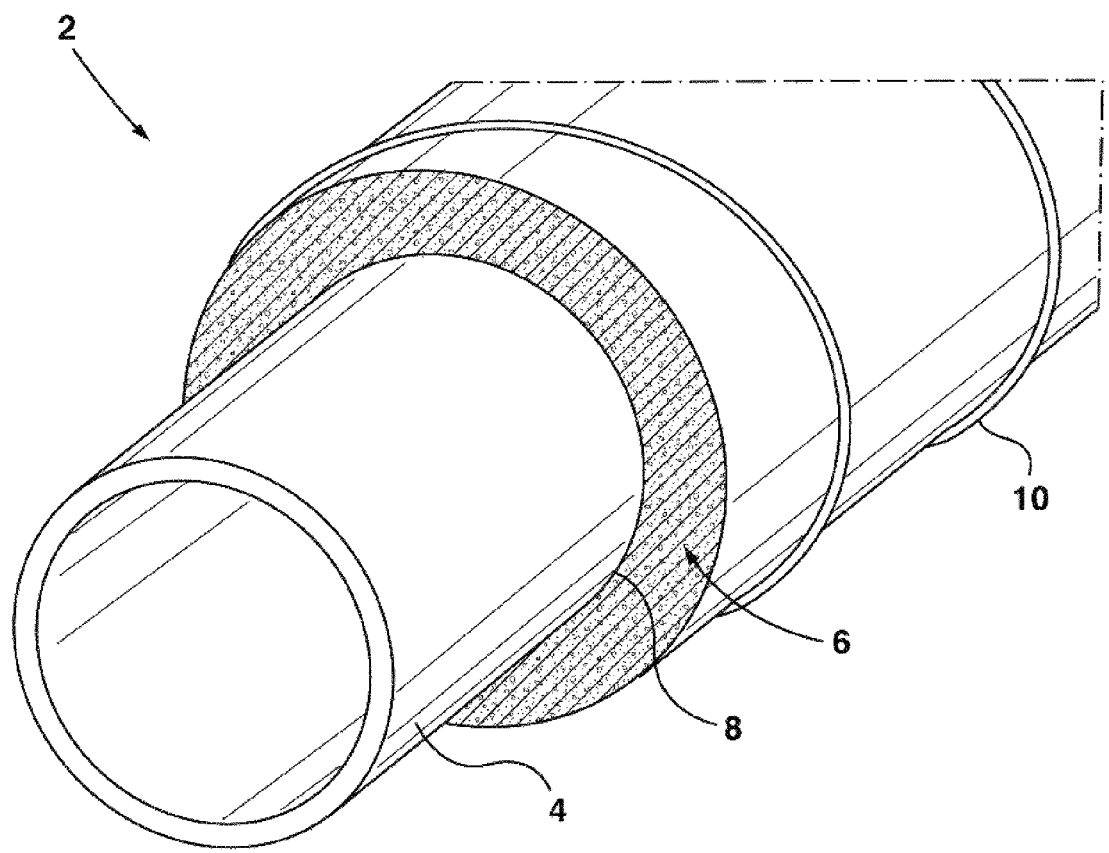
FIG. 1 is a perspective view of an end of a pipe in accordance with one aspect of the specification.

As noted above, in one aspect, the specification relates to a concrete coating composition, comprising:
a thermally stable cement;
glass bubbles;
porous glass spheres or aerogel, or a combination thereof; and
glass fibres.

The type of thermally stable cement used in accordance with the specification is not particularly limited. Thermally stable cement is stable at high temperatures and does not degrade or deteriorate to such an extent that it would lose the ability to function as cement. In one embodiment, thermally stable cements include, for example and without limitation, high alumina cements, oil-well cements and geo-polymer cements. In a further embodiment, high alumina cements can include, for example and without limitation, calcium-aluminate (Ca—Al) cement. In another embodiment, oil well cements can include, for example and without limitation, Class G cement as per American Petroleum Institute (API) 10A specification. In another embodiment, the Class G cement contains Portland cement and 325 mesh silica flour. In another further embodiment, oil well cements can include, for example and without limitation, thermal 40 cement.

Cements along with other agents or additives that provide thermal stability to the cement can also be used to prepare the concrete coating composition disclosed herein. In one embodiment, the cement used is, for example and without limitation, Portland cement and the additive used along with the cement is, for example, silica flour. In another embodiment, for example and without limitation, the thermally stable cement is a combination of Portland cement, fly ash and slag. The quantity of the additive used along with the cement is not particularly limited and can be determined by a skilled worker based on the specific application requirements.

The quantity of cement used in the concrete coating is not particularly limited and would depend upon the application requirements and the desired properties of the coating. In one embodiment, for example and without limitation, the amount of cement in the composition ranges from 350 to 550 kg/m$^3$ of the concrete coating composition. In another embodiment, where the cement is present as a paste, the cement has a volume of, for example and without limitation, 25 to 45% total volume of the concrete coating composition.

The glass bubbles as disclosed herein typically are non-porous hollow centered glass microspheres that have a vacuum in the hollow centre, which can result in low thermal conductivity. In addition, these glass bubbles can provide low-density particles that can have higher filler loading and lower viscosity/improved flow; and can also be chemically and thermally stable. The type of glass bubble used in accordance with the specification is not particularly limited and can include, for example and without limitation, the 3M™ Glass Bubbles that can be commercially available in the K and S series.

The type of glass bubbles selected depends upon the design requirements of the coating composition; as the properties of the glass bubbles can influence the characteristics of the coating. In the concrete coating composition disclosed herein, the size of glass bubbles used is not particularly limited so long as they can provide sufficient concrete properties. In one embodiment, for example and without limitation, the glass bubbles have a size ranging from 60 to 120 microns (μ), and sizes in between. In a further embodiment, the glass bubbles have a size ranging from 75 to 95μ. In a still further embodiment, the glass bubbles have a size ranging from 80 to 85μ.

The glass bubbles as disclosed herein and used in the concrete coating composition can have high strength-to-weight ratio. In one embodiment, the glass bubbles have, for example and without limitation, an isostatic crush strength ranging from 500 to 18,000 psi, and values in between. In a further embodiment, the glass bubbles have an isostatic crush strength ranging from, for example and without limitation, 2,000 to 5,500 psi. In a still further embodiment, the glass bubbles have an isostatic crush strength ranging from, for example and without limitation, 3,000 to 4,000 psi.

As noted above, the glass bubbles used in the concrete coating composition disclosed herein can be low density particles. In one embodiment, for example and without limitation, the density of the glass bubbles can range from about 0.125 to 0.60 g/cc, and values in between. In a further embodiment, the density of the glass bubbles can range from, for example and without limitation, 0.20 to 0.45 g/cc. In a still further embodiment, the density of the glass bubbles can range from, for example and without limitation, 0.35 to 0.38 g/cc.

The quantity of glass bubbles present in the concrete coating composition can depend upon the application requirements of the coating and the desired properties of the coated cement. In one embodiment, for example and without limitation, the glass bubbles range from 1 to 40% volume aggregate (vol agg.), and values in between. In a further embodiment, for example and without limitation, the glass bubbles range from 15 to 30% vol agg.

The porous glass spheres used in the concrete coating composition disclosed herein are not particularly limited. In one embodiment, the porous spheres are obtained by recycling glass. They differ from the glass bubbles due to their porous surface and lack of a hollow vacuum centre. Like the glass bubbles, the porous glass spheres can be light weight, pressure resistant and can be chemically and thermally stable. In one embodiment, the type of porous glass sphere used in the coating composition is, for example and without limitation, Poraver™, which can be commercially available.

The size of the porous glass sphere used is also not particularly limited. In one embodiment, for example and without limitation, the glass sphere has a granular size ranging from 0.04 to 4 mm, and values in between. In a further embodiment, the glass sphere has a granular size ranging from 0.25 to 2 mm.

The strength of the glass sphere used is also not particularly limited, so long as it can provide sufficient coating strength, which would depend upon the application requirements. In one embodiment, for example and without limitation, the glass sphere has a crushing resistance of more than 6.5 N/mm$^2$. Such values can be present in glass spheres having a smaller size. In another embodiment, for example and without limitation, the glass spheres can have a crushing resistance from about 1.4 to about 6.5 N/mm$^2$. In a further embodiment, the glass spheres can have a crushing resistance from, for example and without limitation, 2.6 to 1.4 N/mm$^2$.

As noted above, the glass spheres used in the concrete coating composition disclosed herein can have a low density. In one embodiment, for example and without limitation, the glass spheres have a bulk density ranging from 190±20 to about 530±70 kg/m$^3$. In a further embodiment, the glass spheres have a bulk density ranging from, for example and without limitation, 190±20 to 340±30 kg/m$^3$.

The quantity of glass spheres used in the concrete coating composition disclosed herein is not particularly limited and can depend upon the application requirements. In one embodiment, for example and without limitation, the quantity of glass spheres in the concrete coating composition is present in an amount from 50 to nearly 100% vol aggregate (aggr.). The volume aggregate refers to the volume of aggregate in the total volume of the coating composition. In a further embodiment, the concrete coating composition is present in an amount from, for example and without limitation, 70 to 90% vol. aggr.

As noted above, the concrete coating composition further contains glass fibres. It has been found that presence of glass fibres can provide flexibility to the coating and also aid in preventing cracking of the coated concrete. The type and quantity of glass fibres used is not particularly limited. In one embodiment, for example and without limitation, the glass fibre is an alkali-resistant glass fibre, which can be commercially available from Nycon®. The quantity of such glass fibres can vary and can depend upon the application requirements. In one embodiment, for example and without limitation, glass fibres in the concrete coating composition can be present from about 0 to about 2% vol. total, and values in between. In a further embodiment, the glass fibres are present from, for example and without limitation, 0.1 to 1% vol total. In a still further embodiment, the glass fibres are present from, for example and without limitation, 0.2 to 0.5% vol total.

The length of the glass fibres used in the concrete coating composition is not particularly limited. In one embodiment, the glass fibres are from, for example and without limitation, about ¼" to about 1" in length. In a further embodiment, the glass fibres range from, for example and without limitation, ½" to ¾" in length. Further, the diameter of the glass fibres can vary depending upon the application requirements. In one embodiment, the glass fibres have a diameter of, for example and without limitation, 0.01 to 0.02 mm.

In preparing the concrete, water is generally added to the concrete coating composition. The amount of water added to the composition can depend upon the application requirements of the coated concrete. In one embodiment, for example and without limitation the water to cement (w/c) or water to binder (w/b) ratio ranges from, 0.22 to 0.8. In a further embodiment, the water to cement (w/c) or water to binder (w/b) ratio ranges from, for example and without limitation, about 0.3 to about 0.5.

The concrete coating composition disclosed herein can have additional components depending upon the application requirements of the coated concrete. For example, in one embodiment, it has been found that aerogel can be added to the concrete, such as, for example and without limitation, to cement, to provide further thermal insulation. The aerogel can substitute the porous glass spheres or be present in combination with the glass spheres.

Further to the above, the concrete coating composition can be provided with admixtures that can affect the properties of the concrete coating composition. The amount and type of admixtures used are not particularly limited and can depend upon the application requirements. In one embodiment, for example and without limitation, admixtures can include one or more of air entrainers, super plasticizers and viscosity modifiers.

Example of an air entrainer can include, for example and without limitation, Darex® AEA ED, which can be commercially available. A super-plasticizer as used in the concrete composition, disclosed herein, is formulated to provide higher fluidity for processing. In one embodiment, for example and without limitation, the super-plasticizer used in the concrete composition, disclosed herein, is ADVA® CAST 575, which can be commercially available. The viscosity modifier as used in the concrete composition, disclosed herein, can modify the rheology of the concrete and can allow the concrete to flow without segregation. In one embodiment, for example and without limitation, the viscosity modifier is V-MAR® 3, which can be commercially available.

The quantity of each admixture used is not particularly limited and can depend upon the application requirements of the concrete. In one embodiment, for example and without limitation, each admixture is present from 0 to 5000 mls/100 kg of cement, including values in between. In a further embodiment, for example and without limitation, the admixture is present from about 200 to about 2000 mls/100 kg of cement.

In preparing the coated concrete, the components of the compositions, along with other additives are mixed with water to obtain a consistent mixture, which is then applied to the material to be coated. In one embodiment, for example and without limitation, the material to be coated is a pipe that can be used in downhole steam injection and production operations.

The properties of the coated concrete can vary depending upon the constituents of the composition, the thickness of the coating and the application requirements. In one embodiment, the coating applied to the material has a thickness, for example and without limitation, from about 0.5" to about 2", and each value or range in between. In a further embodiment, the coated concrete has a thickness of, for example and without limitation, 0.75" to 1.25", and each value or range in between.

The compressive strength of the coated concrete can vary and can depend upon the components and application requirements. In one embodiment, for example and without limitation, the concrete coating has a compressive strength measured at 28 days from curing of from 6 to 30 MPa, and values in between. In a further embodiment, the concrete coating has a compressive strength measured at 28 days from curing of from, for example and without limitation, 8 to 20 MPa.

The thermal conductivity (K-factor) of the coated concrete obtained from the composition, disclosed herein, can vary depending upon the constituents of the composition. The K-factor is a measure of the number of BTUs (British Thermal Units) conducted per degree Fahrenheit per foot per hour. In one embodiment, the K-factor of the coated concrete produced in accordance with the specification is, for example and without limitation, from 0.09 to 0.22 w/mK, when measured at room temperature (about 25° C.).

The thermal conductance (U-value) of the coated concrete obtained from the composition, disclosed herein, can vary depending upon the constituents of the composition. The U-value is a measure of the thermal conductance of an item per unit surface area of that item. In one embodiment, the U-value of the coated concrete produced in accordance with the specification is, for example and without limitation, 10 to 20 with 0.75" coating thickness at the temperature of 230° C.

The density of the concrete coating obtained from the composition, disclosed herein, can vary depending upon the constituents of the composition and different densities can be obtained depending upon the application requirements. In one embodiment, for example and without limitation, the fresh density of the coated concrete can range from 500 to 1200 Kg/m$^3$. In a further embodiment, the theoretical fresh density of the coated concrete is, for example and without limitation, from 900 to 1100 Kg/m$^3$.

Figure 2:
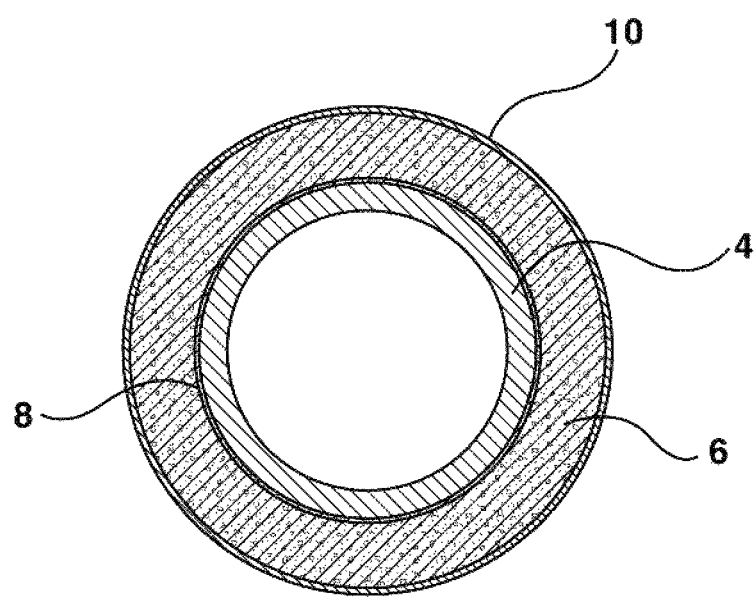
FIG. 2 is an end view of a pipe in accordance with one aspect of the specification.
Figure 3:
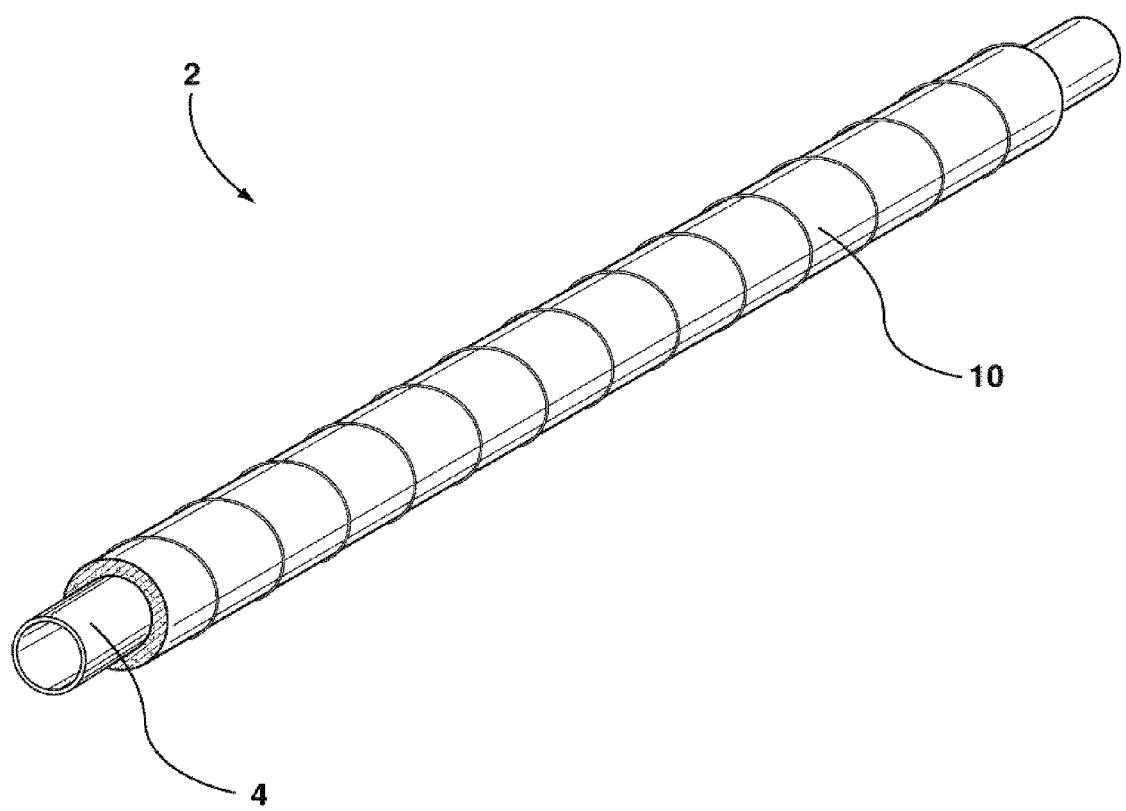
FIG. 3 is a perspective view of a pipe in accordance with one aspect of the specification.

As noted above, the concrete coating composition can be applied to pipes that can be used for various applications, where thermal insulation and continuous high temperature exposure can be required. In one embodiment, the coated pipes are used for oil sands downhole applications. Therefore, in one aspect, the specification discloses a coated pipe (2), containing the pipe (4) and the concrete coating (6) thereon; an embodiment of which is shown in FIGS. 1-3.

In one embodiment, for example and without limitation, the coated pipe (2) further contains an intermediate layer (8) interposed between the concrete coating (6) and the pipe (4). The type of intermediate layer (8) is not particularly limited and can vary depending upon the application requirements. In one embodiment, the intermediate layer (8) can provide further insulation and can prevent cracking of the concrete coating (6). In a further embodiment, the intermediate layer (8) is, for example and without limitation, fibre glass cloth.

In a further embodiment in accordance with the specification, the coated pipe (2), disclosed herein, further contains an outer layer (10) that covers the concrete coating (6). The outer layer (10) can provide further mechanical and environmental protection to the concrete coating (6). In one embodiment, for example and without limitation, the outer layer is made up of a metal jacket.

EXAMPLES

The specification is provided with the following illustrative examples to assist in the understanding of the concrete coating composition and the coated pipe, disclosed herein. The examples are intended to aid in the understanding of the embodiments disclosed, and are not intended to limit the scope of protection.

Example 1: Slump Flow Test

The amount that concretes spreads on a flat, horizontal surface, or slump-flow, after being released from a cone is an indication of the yield value of concrete. Slump-flow can be used to obtain information on the fluidity of the concrete and as a means for controlling the consistency of the concrete.

A slump cone is filled with concrete in three lifts or poured in depending on the consistency and the cone is lifted. After the concrete has stopped spreading, the average diameter is determined.

Example 2: Concrete Rheometer: Determine Yield, Viscosity and Thixotropy

Figure 4:
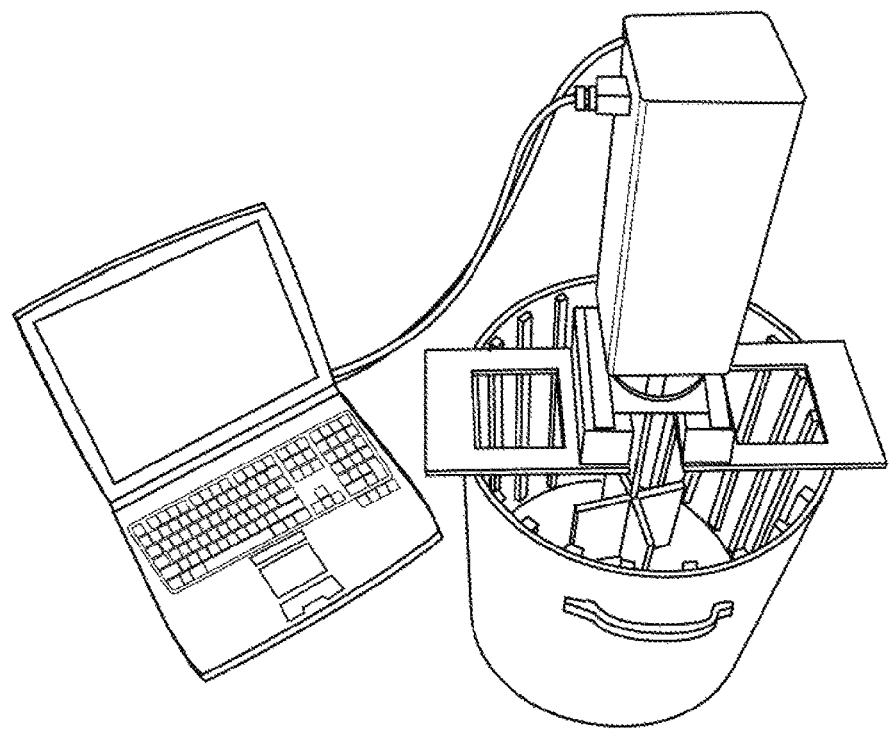
FIG. 4 is a schematic drawing of a ICAR concrete rheometer used for measuring the viscosity of the fluid concrete.

An ICAR concrete rheometer which was used to obtain information on the yield and viscosity values of fluid concretes is shown in FIG. 4. Concrete behaves as a Bingham fluid—a certain amount of energy must be expended to initiate flow. The information was used to estimate potential pressures during pumping and to determine whether the yield value was sufficient to prevent segregation of the lightweight aggregate.

The bowl is filled with approximate 15 liters of concrete and the program started on the laptop computer. The motor is activated and the vane submerged under the concrete turns and the software plots a graph that determines the concrete viscosity and yield value.

TABLE 1

Rheometer Specifications & operational Parameters

| Rheometer Dimensional Parameters | | |
|---|---|---|
| Vane radius | 63.5 | mm |
| Vane height | 127 | mm |
| Container radius | 127.5 | mm |
| Container volume | 0.014 | L |
| Rheometer Operation Parameters | | |
| Initial shear time | 30 | 30 |
| Initial shear rps | 0.6 | 0.5 |
| Test points | 7 | 7 |
| Seconds at each point | 5 | 5 |
| Start rps | 0.6 | 0.5 |
| End rps | 0.05 | 0.05 |

Example 3: Elevated Temperature Curing

Method was devised to accelerate the curing or strength development of the concrete. Curing programs were developed based on temperature and time of exposure of fresh concrete to elevated temperatures (40, 50 and 60° C.) in an oven for 12, 18 and 24 hours.

Figure 5:
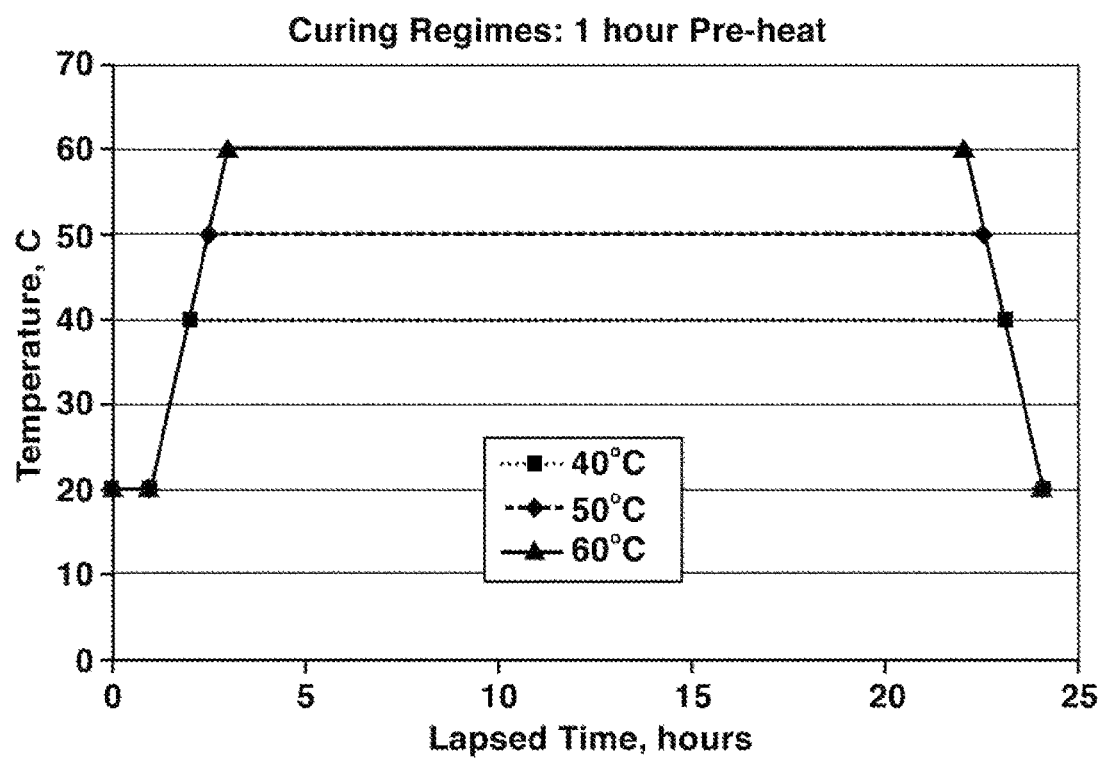
FIG. 5 shows a graph depicting the 24 hour curing program for 40, 50 and 60° C.

The elevated temperature curing regime limits the ramp and cooling rate of the chamber do not exceed 20° C./hr to prevent thermal shock to the fresh concrete. FIG. 5 depicts the 24 hour curing program for 40, 50 & 60° C.

Concrete is cast in moulds and after finishing, the exposed surface is covered with plastic or shrink wrapped to prevent excessive moisture loss from the concrete. After 1 hour in ambient conditions, the moulds are placed into the oven and the curing program executed increasing or decreasing the temperature as required. At the end of the cycle, moulds are removed and the concrete is demoulded and tested for compressive strength at 1, 4, 7 and 28 days.

Example 4: Transient Plane Source—TPS 2500S (ISO/DIS 22007-2.2): Thermal Conductivity, Heat Capacity and Thermal Diffusivity The objective of this testing was to measure thermal conductivity (W/mK), specific heat capacity (J/kg K) and thermal diffusivity ($mm^2/s$) of the concrete at various temperatures (20, 100 and 250° C.).

Figure 6:
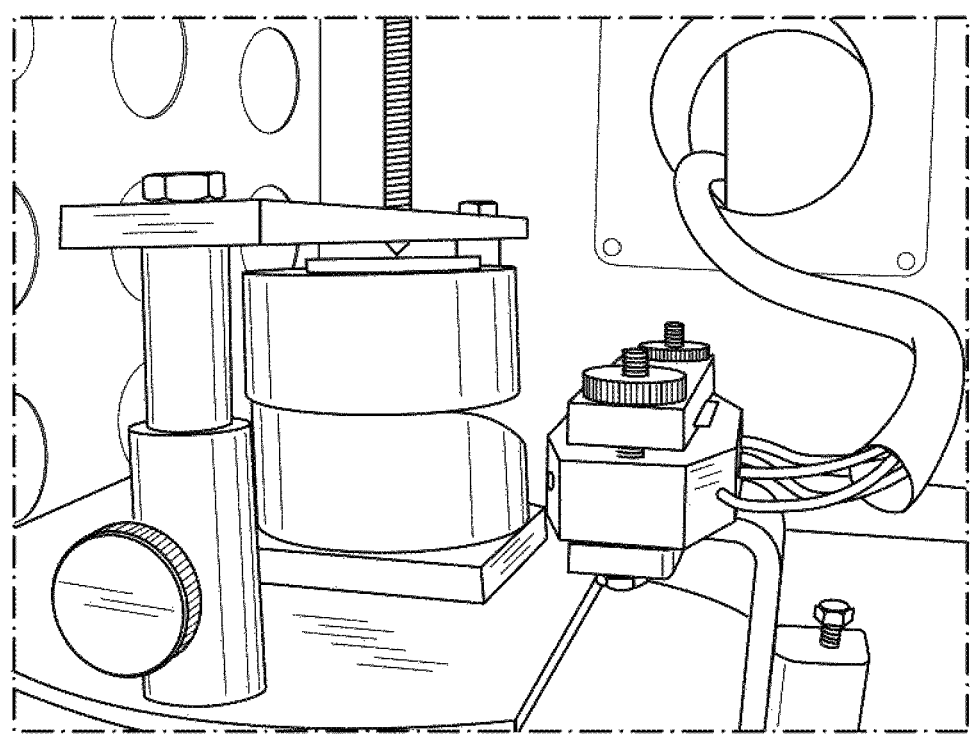
FIG. 6 depicts configuration of the specimens in the test apparatus which determined the thermal conductivity, heat capacity and thermal diffusivity.

Concrete samples were cast and cut into discs that were approximately 2 in. (54 mm) in diameter and 1 in. (25 mm) thick. These discs were tested by method TPS 2500S at an independent test laboratory. FIG. 6 depicts configuration of the specimens in the test apparatus which determined the thermal conductivity, heat capacity and thermal diffusivity.

Example 5: Shear/Push Off Strength Test Procedure

This method was developed to determine the strength of the bond between the concrete coating system and the steel pipe or tubular. This parameter may be considered for pipe handling and installation of insulated coated pipe/tubulars in the field.

Sections of coated pipes approximately 30 cm in length were cut and 10 cm lengths of the coating removed at both ends. A force via a piston is applied directly onto the steel pipe, with the coating being supported on the other end by a steel plate. The maximum force required to dislodge the steel pipe from the coating is used to calculate the shear/push off.

Strength in MPa: by estimating the surface area along the outer diameter of the pipe which is in contact with the coating.

Example 6: Coefficient of Thermal Expansion Via Dynamic Mechanical Analysis

The objective was to determine the coefficient of thermal expansion (CTE) of the concrete via Dynamic Mechanical Analysis using TA Instruments ARES Rheometer. This can also be done via TMA using TA Instruments Q400.

The instrument was set to run in torsion rectangular mode. An aluminum standard was used to obtain calibration factor (calibration factor=actual CTE/observed CTE). A sample approximately 1 mm thick×12.5 mm width×43 mm length) was affixed to grips with a 25 mm gap separation. The sample was heated at 2° C./min from 30° C. to 200° C., using 0.01% strain at 1 radian/s. The calibration factor was applied to the change in length data ($\Delta L$) and the data plot versus temperature. The slope of the plotted line was obtained in the region of interest using Orchestrator software and CTE determined.

Example 7: Cyclic Heat Aging Test Procedure

This method was developed to investigate the effect of exposure to cycles of hot and cold on concrete coating. This experiment will be carried out on laboratory specimens in an oven. The concrete specimens will be observed for physical defects and tested for compressive strength to determine if any degradation occurs.

5 cm cube specimens was cast demoulded and cured in the moisture room for 7 days. Some specimens were tested for compressive strength as the reference before the exposure to heat cycling. Remaining cubes were transferred to the oven at maintained at 230° C. and left for 24 hours. After 24 hours the oven was shut off and specimens allowed to cool for another 24 hours: this represents 1 heating and cooling cycle. 3 cubes were selected and tested for compressive strength after the first cycle. This was repeated for subsequent cycles with the remaining cubes until all specimens were tested, with the last set being exposed to the maximum number of cycles.

Example 8: Concrete Mixing Procedure

This procedure describes the sequence of additions of materials used to make the specified concrete and to obtain the best possible outcomes of the desired fresh properties like rheology and pumpability.

To ensure best possible results, the internal surface of the mixer/mixing bowl should be slightly moistened.

1. First, the lightweight aggregates (Poraver, 3M glass bubbles) are added along with the proportioned amount of mix water and air entrainment admixture if necessary. This is mixed in high shearing planetary type mixer for 3 minutes.

2. Next, the proportioned amount of cement is added to the mixture and further mixing is done for another 5 minutes.

3. Then, the volume of admixtures (superplasticizers, viscosity modifiers) is added to the mixture and mixing if continued for another 5 minutes.

4. Next, the mass of fibers required are introduced and the mixture mixed for 2 minutes.

5. A visual check is made to observe whether clumping of the fibers is present. If this is so, additional mixing for another 3 minutes is required. Otherwise the concrete is suitable for QC tests (slump flow) and ready for pumping or casting.

Using the methods described herein and those known in the art, a number of concrete coating compositions have been prepared. FIG. 7 discloses a table containing summary of some of the compositions prepared and their properties.

EMBODIMENTS

1. A concrete coating composition, containing:
a thermally stable cement;
glass bubbles;
porous glass spheres or aerogel, or a combination thereof; and
glass fibres.

2. The concrete coating composition according to embodiment 1, wherein the thermally stable cement comprises oil well cement, high alumina cement, geopolymer cement or Portland cement blended with fly ash and slag.

3. The concrete coating composition according to embodiment 1 or 2, wherein the thermally stable cement is Portland cement, and further comprising an additive.

4. The concrete coating composition according to embodiment 3, wherein the additive is silica flour.

5. The concrete coating composition according to any one of embodiments 1 to 4, wherein the cement content ranges from 350 to 550 kg/m3.

6. The concrete coating composition according to any one of embodiments 1 to 4, wherein the cement is present as a paste and having a volume of 25 to 45%.

7. The concrete coating composition according to any one of embodiments 1 to 6, wherein the glass bubbles comprises 3M® glass bubbles.

8. The concrete coating composition according to embodiment 7, wherein the 3M® glass bubbles have a size ranging from 75 to 177 microns.

9. The concrete coating composition according to any one of embodiments 1 to 8, wherein the glass bubbles have an isostatic crush strength ranging from 500 to 5,500 psi.

10. The concrete coating composition according to any one of embodiments 1 to 9, wherein the glass bubbles have a true density ranging from 0.20 to 0.45 g/cc.

11. The concrete coating composition according to any one of embodiments 1 to 10, wherein glass bubbles are present in a range from 0 to 30% vol agg.

12. The concrete coating composition according to any one of embodiments 1 to 11, wherein porous glass spheres comprises Poraver® glass spheres.

13. The concrete coating composition according to any one of embodiments 1 to 12, wherein the porous glass spheres are present in a range from 70 to 90% vol. agg.

14. The concrete coating composition according to any one of embodiments 1 to 13, wherein the glass fibres have a length from about ¼" to about 1" in length.

15. The concrete coating composition according to embodiment 14, wherein the glass fibres diameter range in size from 0.01 to 0.02 mm.

16. The concrete coating composition according to embodiment 14 or 15, wherein the glass fibres are alkali resistant glass fibres.

17. The concrete coating composition according to any one of embodiments 14 to 16, wherein the glass fibres are present in a range from 0.1 to 1% vol. total.

18. The concrete coating composition according to any one of embodiments 1 to 17, further comprising water.

19. The concrete coating composition according to embodiment 18, wherein the water to cement ratio ranges from 0.2 to 0.6.

20. The concrete coating composition according to embodiment 18, wherein the water to binder ratio ranges from 0.2 to 0.6.

21. The concrete coating composition according to any one of embodiments 1 to 20, further comprising one or more admixtures.

22. The concrete coating composition according to embodiment 21, wherein the one or more admixtures comprise air entrainer, super plasticizer and/or viscosity modifier.

23. The concrete coating composition according to embodiment 21 or 22, wherein the one or more admixtures are present in amount ranging from 0 to 5000 mls/100 kg cement.

24. The concrete coating composition according to any one of embodiments 1 to 23, wherein the concrete coating composition has compressive strength measured at 28 days ranging from 6 to 30 MPa.

25. The concrete coating composition according to any one of embodiments 1 to 24, wherein the concrete coating composition has a K-factor ranging from 0.09 to 0.22 w/mK, when measured at room temperature.

26. The concrete coating composition according to any one of embodiments 1 to 25, wherein the concrete coating composition has a U-value ranging from 10 to 20 with 0.75" coating thickness at the temperature of 230° C.

27. The concrete coating composition according to any one of embodiments 1 to 26, wherein the concrete coating composition has a fresh density ranging from 500 to 1200 Kg/m3.

28. A coated pipe, containing:
a pipe; and
the concrete coating composition as defined in any one of embodiments 1 to 27.

29. The externally coated pipe according to embodiment 28, further comprising an intermediate layer interposed between the pipe and the coating composition.

30. The coated pipe according to embodiment 29, wherein the intermediate layer comprises a fiber glass cloth.

31. The coated pipe according to any one of embodiments 28 to 30, further comprising an outer layer.

32. The coated pipe according to embodiment 31, wherein the outer layer comprises a metal jacket.

33. A process for manufacturing the concrete coating composition as defined in any one of embodiments 1 to 27, comprising mixing components of the composition as defined in any one of embodiments 1 to 27.

34. A process of manufacturing the coated pipe as defined in any one of embodiments 28 to 32, comprising mixing components of the concrete coating composition as defined in any one of embodiments 1 to 27; and applying the coating composition on a pipe.

35. A process for extracting hydrocarbon, comprising use of the coated pipe as defined in any one of embodiments 1 to 27.

36. A process for insulating an internal fluid in a container or conduit, wherein the container or conduit has applied thereon the concrete coating composition as defined in any one of embodiments 1 to 27.

37. The process according to embodiment 36, wherein the fluid is at a temperature from 100 to 300° C.

38. The process according to embodiment 36, wherein the fluid is at a temperature from 200 to 260° C.

Certain adaptations and modifications of the described embodiments can be made. Therefore, the above discussed embodiments are considered to be illustrative and not restrictive.

What is claimed is:

1. A coated pipe, comprising:
a pipe; and
a concrete coating composition coating the pipe, the concrete coating composition comprising:
a thermally stable cement;
glass bubbles;
porous glass spheres or aerogel, or a combination thereof;
glass fibres; and
an insulating fiber glass cloth intermediate layer interposed between the pipe and the concrete coating composition that insulates the pipe and prevents cracking of the concrete coating, whereby together the pipe, the insulating fiber glass cloth intermediate layer, and the concrete coating composition are exposed to and insulate a fluid having a continuous temperature ranging from 200° C. to 260° C.

2. The coated pipe of claim 1 further comprising an outer layer covering the coating composition.

3. The coated pipe of claim 2 wherein the outer layers comprises a metal jacket outer layer.

4. A process for insulating an internal fluid in a container or conduit comprising:
providing the container or conduit;
providing a concrete coating composition comprising;
a thermally stable cement,
glass bubbles,
porous glass spheres or aerogel, or a combination thereof,
glass fibres,
coating the container or conduit with the concrete coating composition;
providing an insulating fiber glass cloth intermediate layer interposed between the container or conduit and the concrete coating composition, wherein the concrete coated container or conduit having the insulating fiber glass cloth insulates a fluid having a temperature ranging from 100 to 300° C. residing therein; and
extracting hydrocarbons with the concrete coated container or conduit.

5. The coated pipe of claim 1, wherein the thermally stable cement comprises oil well cement, high alumina cement, geopolymer cement, or Portland cement blended with fly ash and slag.

6. The coated pipe of claim 1, wherein the thermally stable cement is Portland cement, and further comprising an additive.

7. The coated pipe of claim 6, wherein the additive is silica flour.

8. The coated pipe of claim 1, wherein the cement content ranges from 350 to 550 kg/m$^3$.

9. The coated pipe of claim 1, wherein the cement is present as a paste and having a volume of 25 to 45% total volume of the concrete coating composition.

10. The coated pipe of claim 1, wherein the glass bubbles comprise non-porous hollow centered glass microspheres having a vacuum in the hollow center to provide low thermal conductivity.

11. The coated pipe of claim 10, wherein the glass bubbles have a size ranging from 60 to 177 microns.

12. The coated pipe of claim 10, wherein the glass bubbles have an isostatic crush strength ranging from 500 to 18,000 psi, and a true density ranging from 0.125 to 0.60 g/cc.

13. The coated pipe of claim 10, wherein the glass bubbles are present in a range from 1 to 40% vol agg.

14. The coated pipe of claim 1, wherein the porous glass spheres have a crushing resistance from about 1.4 to about 6.5 N/mm$^2$ or greater, and a bulk density ranging from 170 to about 600 kg/m$^3$.

15. The coated pipe of claim 1, wherein the porous glass spheres are present in a range from 50 to 90% volume aggregate, or greater.

16. The coated pipe of claim 1, wherein the glass fibres have a length from about ¼" to about 1" in length.

17. The coated pipe of claim 1, wherein the glass fibres have a diameter ranging in size from 0.01 to 0.02 mm.

18. The coated pipe of claim 1, wherein the glass fibres are alkali resistant glass fibres.

19. The coated pipe of claim 1, wherein the glass fibres are present in a range from 0.1 to 2% vol. total.

20. The coated pipe of claim 1, further comprising one or more admixtures.

21. The coated pipe of claim 20, wherein the one or more admixtures are selected from the group consisting of air entrainer, super plasticizer, viscosity modifier and combinations thereof.

22. The coated pipe of claim 20, wherein the one or more admixtures are present in amount ranging from 0 to 5000 mls/100 kg cement.

23. The coated pipe of claim 1, wherein the concrete coating composition has compressive strength measured at 28 days ranging from 6 to 30 MPa.

24. The coated pipe of claim 1, wherein the concrete coating composition has a K-factor ranging from 0.09 to 0.22 w/mK, when measured at room temperature.

25. The coated pipe of claim 1, wherein the concrete coating composition has a U-value ranging from 10 to 20 with 0.75" coating thickness at the temperature of 230° C.

26. The coated pipe of claim 1, wherein the concrete coating composition further comprises water.

27. The coated pipe of claim 1, wherein the concrete coating composition has a fresh density of the coated concrete can range from 500 to 1200 Kg/m$^3$.

28. The process of claim 4, wherein the thermally stable cement comprises oil well cement, high alumina cement, geopolymer cement or Portland cement blended with fly ash and slag.

29. The process of claim 4, wherein the cement content ranges from 350 to 550 kg/m$^3$.

30. The process of claim 4, wherein the cement is present as a paste and having a volume of 25 to 45%.

31. The process of claim 4, wherein the glass bubbles comprise non-porous hollow centered glass microspheres having a vacuum in the hollow center to provide low thermal conductivity.

32. The process of claim 4, wherein the porous glass spheres have a crushing resistance from about 1.4 to about 6.5 N/mm$^2$, a bulk density ranging from 170 to about 600 kg/m$^3$.

33. The process of claim 4, wherein the porous glass spheres are present in a range from 70 to 90% volume aggregate, or greater.

34. The process of claim 4, further comprising one or more admixtures selected from the group consisting of air entrainer, super plasticizer, viscosity modifier and combinations thereof, present in amount ranging from 0 to 5000 mls/100 kg cement.

35. The process of claim 4, wherein the concrete coating composition has compressive strength measured at 28 days ranging from 6 to 30 MPa.

36. The process of claim 4, wherein the concrete coating composition has a K-factor ranging from 0.09 to 0.22 w/mK, when measured at room temperature.

37. The process of claim 4, wherein the concrete coating composition has a U-value ranging from 10 to 20 with 0.75" coating thickness at the temperature of 230° C.

38. A coated pipe, comprising:
a pipe; and
a concrete coating composition coating the pipe, the concrete coating composition having a U-value ranging from 10 to 20 with 0.75" coating thickness at the temperature of 230° C. comprising:
a thermally stable cement;
non-porous hollow centered glass bubbles;
porous glass spheres or aerogel, or a combination thereof;
glass fibres; and
an insulating fiber glass cloth layer interposed between the pipe and the concrete coating composition, said insulating fiber glass cloth layer insulating the pipe and preventing cracking of the concrete coating,
wherein the concrete coating composition, the insulating fiber glass cloth layer and the pipe together insulate and are exposed to a fluid having a temperature ranging from 100 to 300° C.

39. The process of claim 4, wherein the fluid is at a temperature from 200° C. to 260° C.

40. The coated pipe of claim 38, wherein the fluid is at a continuous temperature ranging from 200° C. to 260° C.

* * * * *